Nov. 19, 1968  C. VAN DER LELY ET AL  3,411,467

SEED DRILLS

Filed March 18, 1965  7 Sheets-Sheet 1

INVENTORS
CORNELIS VAN DER LELY
LEENDERT VAN WINGERDEN
BY
Mason, Mason & Albright
Attorneys

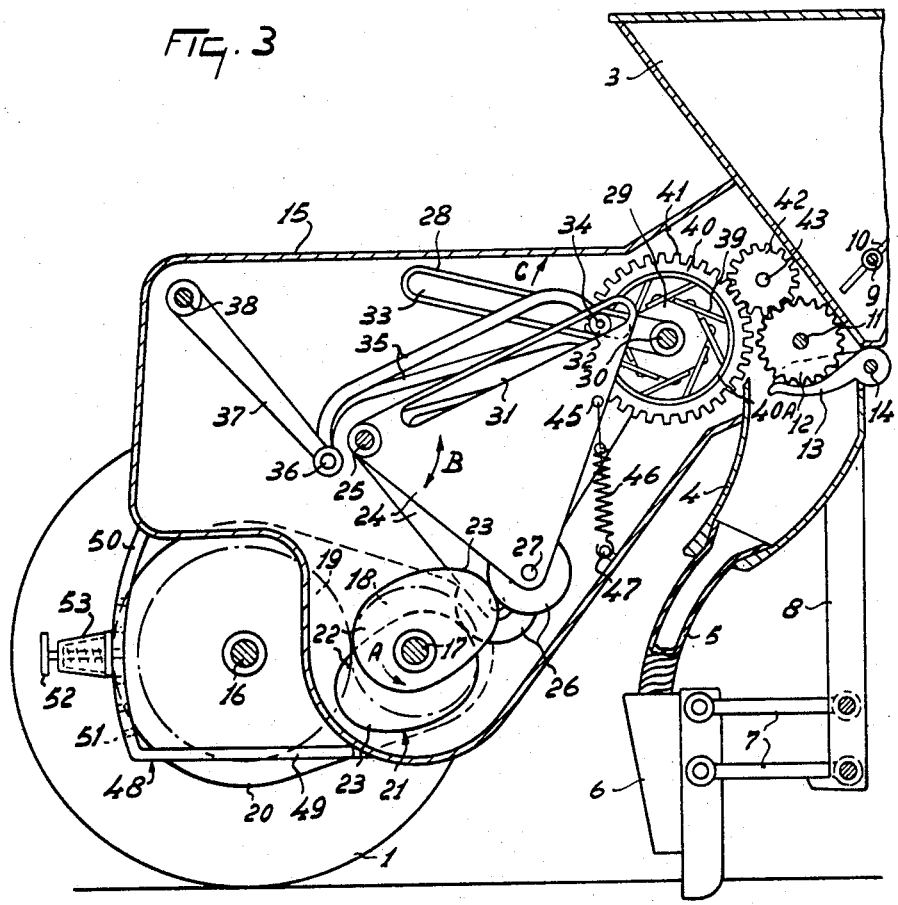

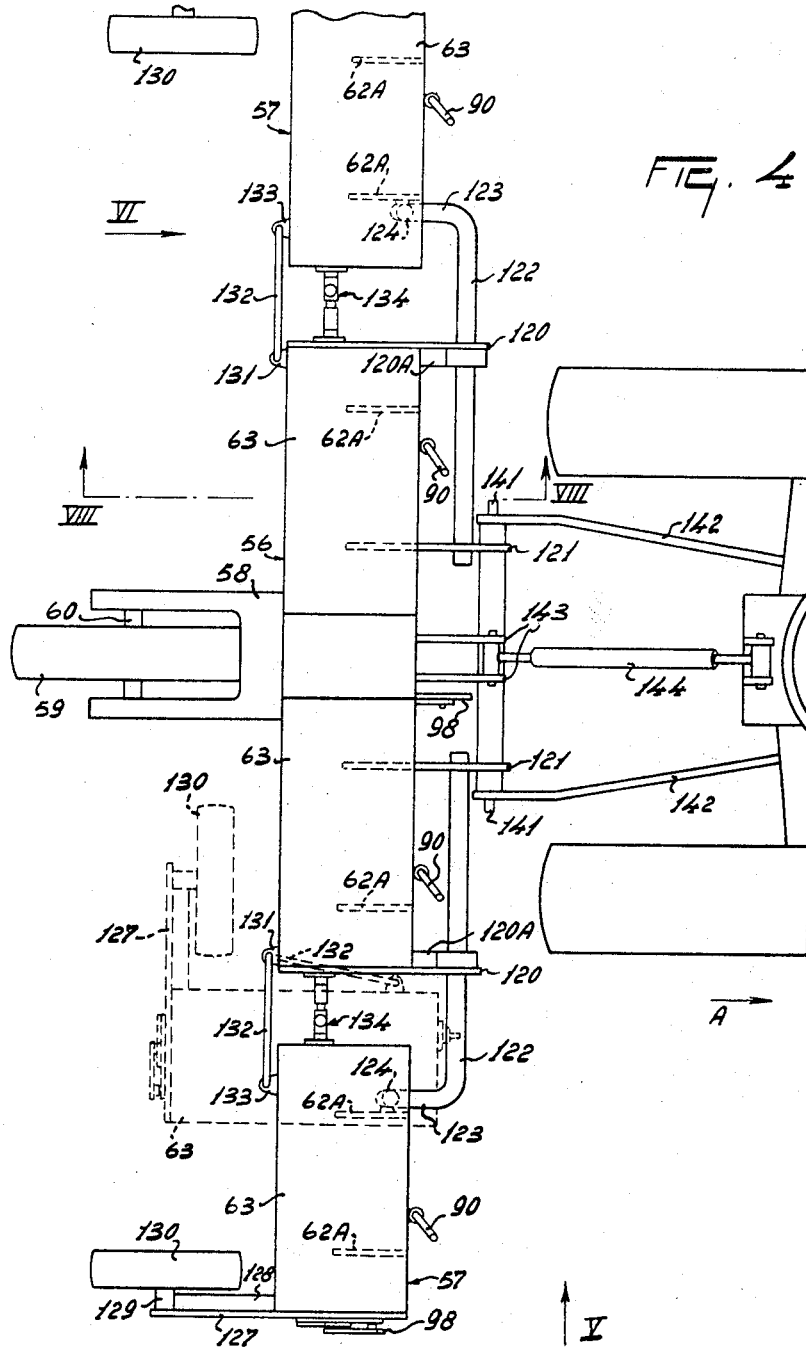

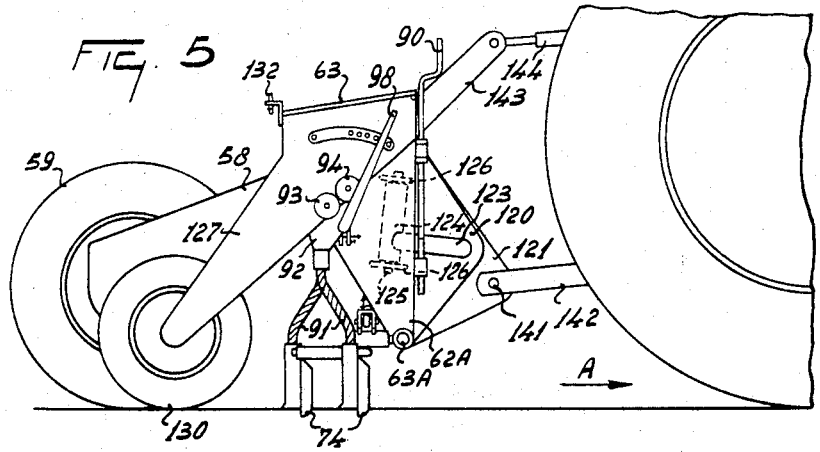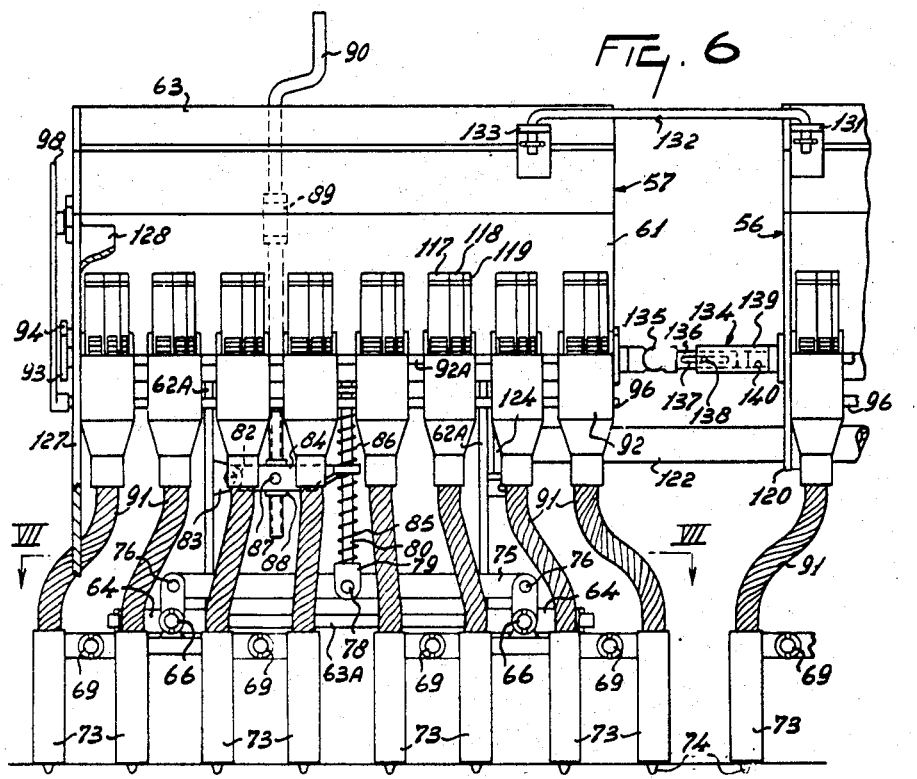

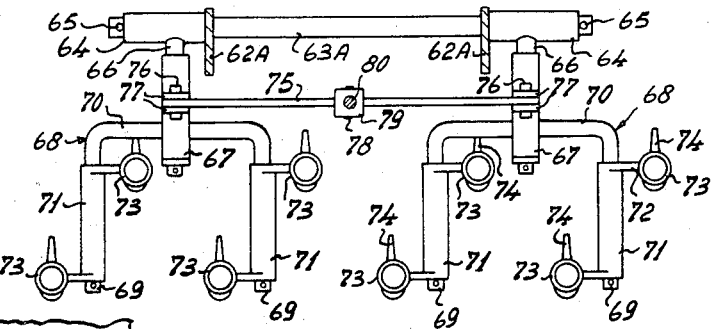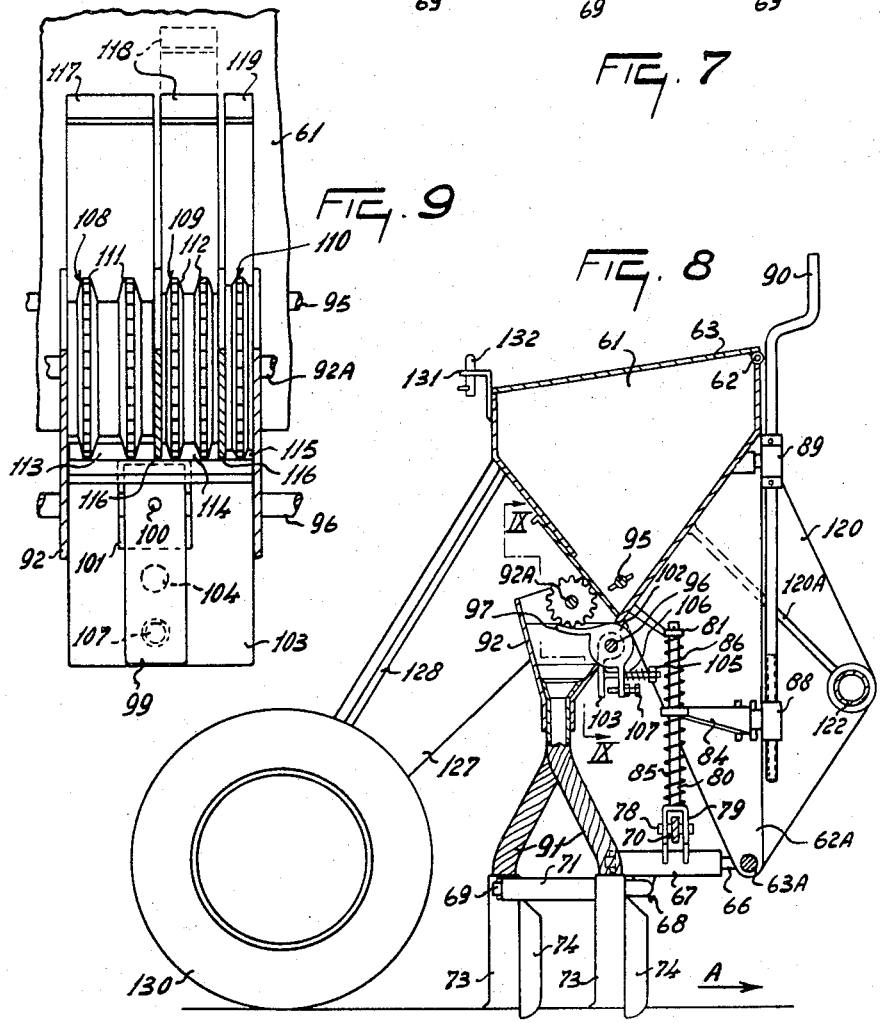

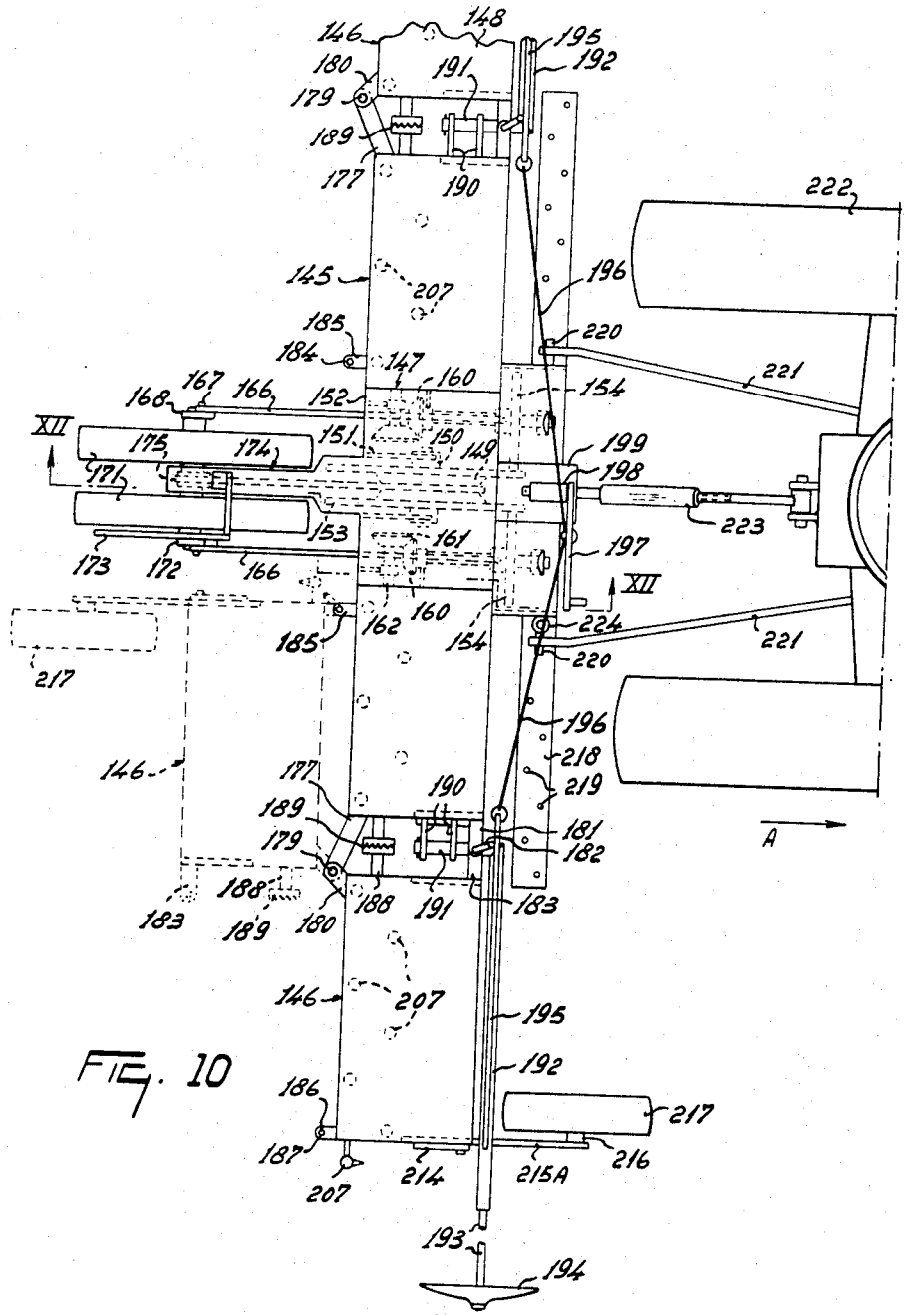

United States Patent Office 3,411,467
Patented Nov. 19, 1968

3,411,467
SEED DRILLS
Cornelis Van Der Lely, Zug, Switzerland, and Leendert Van Wingerden, Dubbeldam, Netherlands, assignors to C. van der Lely N.V., Maasland, Netherlands, a Dutch limited-liability company
Filed Mar. 18, 1965, Ser. No. 440,869
Claims priority, application Netherlands, Mar. 25, 1964, 6403163; Feb. 10, 1965, 6501603; Mar. 1, 1965, 6502536
17 Claims. (Cl. 111—54)

ABSTRACT OF THE DISCLOSURE

A seed drill machine having a central and two outer portions all with hoppers. The two outer portions are pivotable about nonhorizontal axes to transport position and turnable about horizontal axes to independently move up and down over uneven ground. The machine is connectable to a three point lifting hitch of a tractor. Each portion has one or more ground wheels. A seed shaft is regulated to dispense seeds to a feed tube under a hopper. A drive mechanism for the seed shaft controls the speed of rotation of the seed shaft.

---

The invention relates to a seed drill comprising two outmost portions, each being supported by at least one ground wheel.

According to the invention the said portions together with the said ground-wheels are turnable in order to bring the machine in a transport position.

For a better understanding of the invention and to show how the same may be readily carried into effect, reference is made by way of example to the accompanying drawings, in which:

FIG. 3 is an elevation taken on the line III—III in FIG. 2.

FIG. 4 shows diagrammatically partly a plan view of a machine in one embodiment according to a further development of the invention.

FIG. 5 is an elevation in the direction of the arrow V in FIG. 4.

FIG. 6 shows on a larger scale a partial elevation in the direction of the arrow VI in FIG. 4.

FIG. 7 is an elevation taken on the line VII—VII in FIG. 6.

FIG. 8 is an elevation taken on the line VIII—VIII in FIG. 4.

FIG. 9 is an elevation taken on the line IX—IX in FIG. 8.

FIG. 10 is a plan view of a machine in one embodiment according to a further development of the invention.

Figure 1:
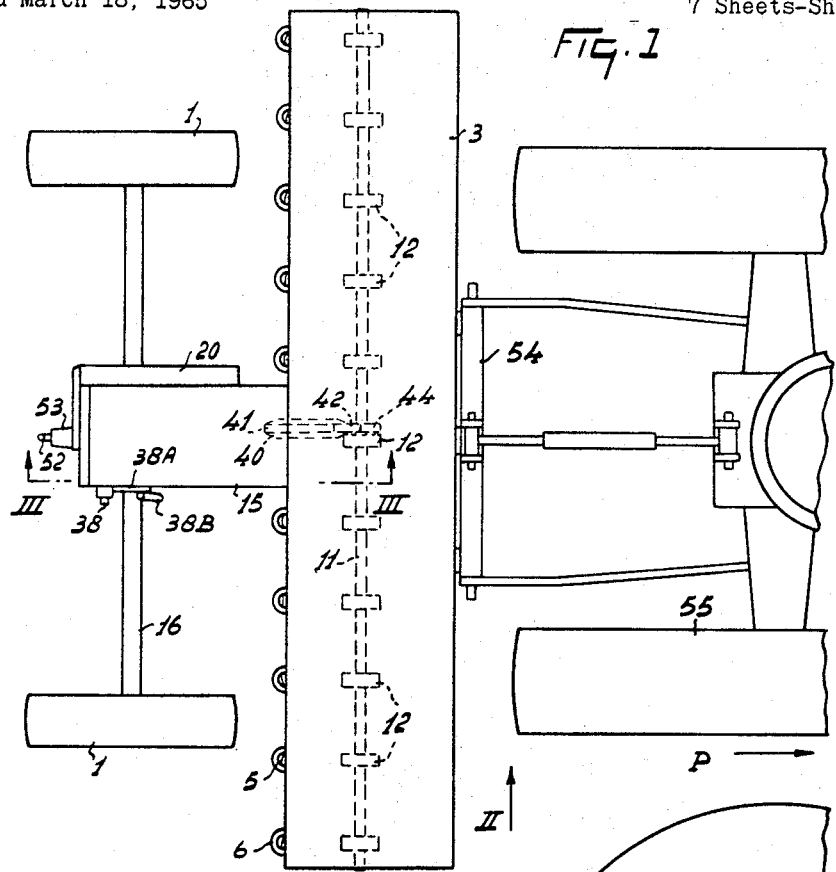
FIG. 1 is a plan view of a seed drill according to the invention.
Figure 2:
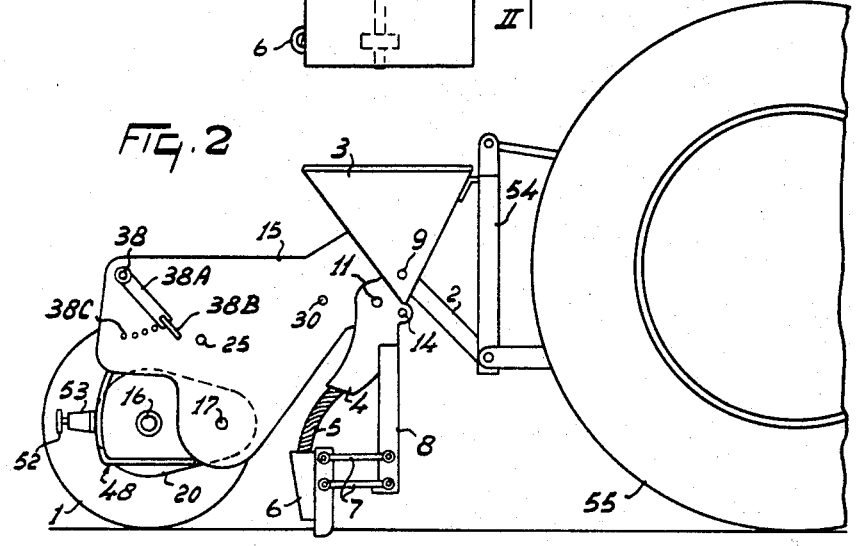
FIG. 2 is a side elevation in the direction of the arrow II in FIG. 1.

The machine shown in FIGS. 1 and 2 is a seed drill, comprising a frame 2, supported from ground wheels 1 and provided with a seed hopper 3. The seed hopper is provided with a plurality of feed cups 4, with which the feed tubes 5 communicate, the lower ends of which terminate in furrow openers 6. These furrow openers are coupled by means of a pivotal parallelogram-shaped rod system 7 with a support 8, extending beneath the seed hopper 3. A stirring shaft 9 is arranged in the seed hopper 3 so as to extend in the longitudinal direction thereof. Said shaft is provided with agitating members 10. In order to convey the seeds from the seed hopper 3 into the feed tubes 5, the embodiment shown of the seed drill comprises a cam wheel feeder mechanism, which comprises a seed shaft 11, extending parallel to the seed hopper 3 and provided with a cam wheel 12 for each feed tube 5 in the feed cup 4. Beneath each cam wheel 12 there is arranged a spring-loaded bottom flap 13, which is adapted to pivot about a shaft 14 for cooperating with the cam wheel 12. The seed shaft 11 is driven via a variator arranged in a housing 15, fastened to the frame 2, by means of which the speed of the seed shaft or cam wheel shaft 11 can be varied. The housing 15 is arranged centrally behind the seed hopper 3 (see FIG. 2).

The driving of the cam wheel shaft 11 is shown in detail in FIG. 3. From this figure it will be apparent that the lower shaft of the housing 15 accommodates a shaft 17, extending transversely of the intended direction of travel of the machine and parallel to the axis 16 of the ground wheels. A gear wheel 18 is fastened to said shaft for cooperation with a gear wheel 19 on the axle 16 of the ground wheels. The gear wheels 18 and 19 are surrounded by a gear box 20. The housing 15 accommodates an eccentric mechanism 21, which comprises two cams 22, arranged on the shaft 17 journalled in the housing 15 and adapted to be driven from the axle 16 of the ground wheel. The cams 22 on the shaft 17 are identical and arranged relatively to each other so that their effective sliding faces 23 overlap each other partly. The drive in the housing 15 comprises furthermore an arm 24, formed by a triangular tumbler plate, which is hinged at one corner by means of a shaft 25 to the housing 15. A further corner of the triangular plate, as will be seen from the figure, is provided with a roller 26, which is seated on a shaft 27 and is adapted to cooperate with the sliding face of one of the cams 22 on the shaft 17. The remaining corner is hinged to a lever 28 on a pawl wheel 29, which is freely rotatable about a shaft 30, which is also journalled in the housing 15. The plate-shaped arm 24 is provided with a slot 31, which extends from the corner of the plate coupled with the lever 28 towards the first-mentioned corner hinged to the housing 15. A roller 32 is adapted to move in the slot 31 and in an identical slot 33 provided in the lever 28. The roller constitutes a pivotal joint between the arm 24 and the lever 28 and is arranged on a shaft 34, which is secured to an arm 35. The arm 35 is pivoted at its other extremity by means of a shaft 36 to an adjusting arm 37. The setting arm 37 is arranged on a shaft 38, journalled in the housing 15. On the outside of the housing 15 this shaft is provided with an arm 38A, which can be moved into and fixed in various positions by means of a pin 38B and the holes 38C in the housing 15 (see FIG. 2).

From FIG. 3 it will be seen that for each cam 22 there is provided an arm 24, formed by a triangular plate and adapted to cooperate with a lever 28, fastened to a pawl wheel 29 on the shaft 30, journalled in the housing 15. The two pawl wheels are arranged side by side. At their peripheries the pawl wheels 29 are provided with resilient strips 39, which are adapted to cooperate with the inner side of a jacket 40, surrounding each pawl wheel 29. The jacket 40 is also freely rotatable about the shaft 30 and is provided on the inner side with friction material 40A, whereas the outer side is provided with toothing 41. The toothing 41 is adapted to cooperate with a gear wheel 42, arranged on a shaft 43, the teeth thereof engaging the teeth of a gear wheel 44 on the cam wheel shaft 11 (see FIG. 1). The arm 24 is provided with a pin 45, to which one end of a spring 46 is secured, the other end of which spring is coupled by a pin 47 with a wall of the housing 15.

It will be apparent from FIGS. 2 and 3 that on the rear side of the machine the housing 15 is provided with a bracket 48, comprising a horizontal portion 49 and a vertical potrion 50. The vertical portion 50 of the bracket 48 is provided with a number of holes 51, lying one above the other and accommodating a spring-controlled pin 52, which is coupled with an arm 53 on the ground wheel axle 16. By means of the arm 53 the ground wheel axle 16 can be pivoted relatively to the frame about the shaft 17, supporting the cams 22 and located between the axle 16 and the seed hopper 3, so that the depth of sowing can be varied. The pin 52 provides locking in a given position.

The seed drill is provided with coupling means 54, by means of which the machine can be hitched to the three-point lift of a tractor 55.

The seed drill described above operates as follows.

In operation the seed drill is moved by the tractor in the direction of the arrow P, the furrow opener 6 then forming a shallow furrow in the soil, the seed conveyed from the seed hopper falling through the feed tubes 5 into the said furrow. As stated above the feed of the seed from the seed hopper 3 is provided by a cam wheel feed mechanism, which is driven via the variator described above. Driving is obtained from the ground wheel axle 16 by means of the gear wheels 18 and 19, the shaft 17 rotating in the direction of the arrow A. The cams 22 on the shaft, each adapted to cooperate with a tumbler arm 24, formed by a triangular plate, cause the arm to reciprocate in the direction of the arrows B during operation. The arm turns about the shaft 25, secured to the housing 15 and by means of the displaceable roller 32, the lever 28 coupled with a pawl wheel 29 is moved, during the upward movement of the arm, in the direction of the arrow C. A pawl wheel 29 catches the jacket 40 surrounding said pawl wheel so that through the toothing 41 on the jacket, the gear wheel 42 and the gear wheel 44 on the cam wheel shaft 11 the latter shaft is driven.

Since the operative sliding faces of the cams 22 of the eccentric mechanism overlap each other, the drive of the pawl wheel structure by means of the arms 24 cooperating with said cams and associated with the driving connection is such that a continuous rotation of the cam wheel shaft 11 is ensured. The spring 46 provided on each arm 24 ensures that the roller 26 is constantly in touch with the sliding face of a cam 22. By means of the roller 32, which establishes the pivotal joint between the driving arm 24 and the lever 28 of a pawl wheel 29, the driving connection can be varied so that the speed of revolution of the seed or cam wheel shaft 11, coupled with the pawl wheel structure, is varied. By displacement of the arm 38A located beyond the housing the roller 32 can be moved through the arms 37 and 35 in a direction towards or away from the pivotal point 25 of the arm 24 and the housing 15. The stroke of the lever 28 coupled with a pawl wheel 29 is thus enlarged or reduced, so that the speed of revolution of the seed or cam wheel shaft 11 is increased or decreased. An increase in speed of the seed or cam wheel shaft increases the quantity of seeds sown per hectar, whereas a decrease in speed of said shaft reduces said quantity.

With the aid of the variator described above the quantity of seeds to be sown can be accurately determined.

The seed drill shown in FIGS. 4 to 9 comprises a central portion 56, on either side of which there is arranged a portion 57, which is pivotal relative to the central portion in a manner to be described more fully hereinafter. The central portion 56 comprises two seeder units located side by side and spaced apart from each other by a given space.

The space between the two seeder units communicates with a housing 58 and accommodates a transmission (not shown and not further described) coupled with the various moving parts of the feed mechanism of the seeder units and operatively connected with a drive (not shown and not further described) in the housing 58, formed for example by a type of drive described with reference to the preceding embodiment. The housing 58 extends from the space between the seeder units obliquely downwards and rearwards (see FIG. 5) and, as is shown in FIG. 4, it has mainly the form of a U. Between the limbs of the U there is arranged a ground wheel 59 for supporting the central portion. The ground wheel 59 is fastened to a shaft 60, journalled in the walls of the U-shaped parts of the housing 58. The shaft 60 of the ground wheel 59 is coupled with the drive arranged in the limbs of the housing 58 for the feed mechanism of the seeder units. Each of the portions 57 of the machine comprises one seeder unit which is completely identical to the seeder units of the central portion 56. The construction and assembly of a seeder unit will be described in detail with reference to FIG. 6, which shows the seeder unit of a portion 57.

Each seered unit comprises a sed hopper 61, which extends transversely of the direction of travel and has a funnel-shaped cross section (see FIG. 8). On the upper side the hopper is covered by a lid 63, adapted to hinge about a shaft 62. At a given distance from the extremity, on the front side, the hopper 61 is provided wih plates 62A, extending in downward direction parallel to the direction of travel. The lower sides of the plates 62A are connected by a beam 63A, extending transversely of the traveling direction and having a length which is approximately equal to the length of a seed hopper 61. Near the ends the beam 63A is provided with bearings 64, which are held in place by means of pins 65 and the plates 62A, fastened to the beam 63A (see FIG. 7). Each bearing 64 is provided with a stub shaft 66, extending in the intended direction of travel of the machine and having a bearing 67 pivotally arranged on it. Each bearing 67 is coupled with a support 68, which has the shape of a U viewed from above. The limbs 69 of the U-shaped support 68 extend in the intended direction of travel and, with respect to the beam 63A to the rear, while the web 70 is secured at its center to the bearing 67. A bearing 71 is adapted to pivot about each of the limbs 69 of the U-shaped support 68. Each bearing 71 is provided on either side by means of a support 72 with a furrow opener 73. From FIG. 7 it will be seen that the furrow openers 73 are arranged at the ends of the bearing 71, so that they are offset relatively to each other. The bearings 67 connected with a support 68 are intercoupled by means of an arm 75. The arm 75 is hinged by means of a pin 76 between ears 77, secured to a bearing 67. The arm 75 extends transversely of the intended direction of travel and parallel to the beam 63A located beneath the seed hopper and by means of a shaft 78 it is coupled near its center with a fork-like portion 79, secured to one end of a rod 80, arranged below the seed hopper 61. The rod 80 is taken through a hole provided in a tag 81, secured to the seed hopper (FIG. 8). The rod 80 is furthermore taken through a hole in a stop 84, extending transversely of the intended direction of travel and hinged by means of a shaft 82 to a support 83 on a plate 62A. Between the stop 84 and the fork-like portion 79 the rod 80 is surrounded by a spring 85 and between the tag 81, secured to the lower side of the hopper 61, and the upper side of the stop 84 the rod 80 is surrounded by a spring 86. The stop 84 is hinged by means of a shaft 87 to a block 88, which is provided with a tapped hole adapted to cooperate with a screw-threaded extremity of a screw spindle 90, arranged in a bearing 89 on the hopper 61.

In each of the furrow openers arranged on a U-shaped support 68 there opens out a feed tube 91, which is connected with a feed cup 92, provided on the lower side of the hopper. The feed cups 92 provide one for each feed tube are arranged on the rear side of the hopper at equal distances from each other. From FIG. 6 it will be seen that each hopper 61 communicates with eight feed tubes 91, which are arranged in two groups of four tubes.

Beyond each hopper 61, on the lower side, there is arranged a seed shaft 92A, located in front of the hopper viewed in the intended direction of travel (see FIG. 8). One end of the seed shaft 92A is provided with a gear wheel 93, which is adapted to cooperate with a gear wheel 94 arranged on an agitator shaft 95 in the lower side of the hopper. For the portions 57 the gear wheel connection between the seed shaft and the agitator shaft is located on the external side (see FIG. 8). For the central portion 56 the said gear wheel connection is located in the space provided between the seeder units.

The seed shaft 92A is provided, opposite the feed cups 92 in a wall of the seed hopper, with cam wheels, which are adapted to cooperate with a bottom flap 97 on a shaft 96 arranged beneath the hopper 61. The shaft 96, on which the bottom flaps 97 are arranged, and which extends below the hopper 61, is provided on one side (see FIG. 6) with a lever 98, which can be adjusted to different positions with respect to the hopper 61. In the central portion 56 a lever 98 is provided between the seeder units (see FIG. 4). A tag 99 is fastened to the shaft 96 by means of a pin 100. The tag 99, as will be seen from FIG. 8, is located in a recess 101 of a bearing 102, to which the bottom flap 97 is fastened. The bearing 102 is freely rotatable on the shaft 96 and is provided with an extension 103, extending in downward direction. The extension 103 is provided with a hole through which a pin 104 is taken, one end of which is secured to the tag 99. The free end of the pin 104 is provided with screwthread for receiving a nut 105. Between the nut 105 and the extension 103 the pin 104 is surrounded by a spring 106. Near the free end the extension is provided with a tapped hole accommodating a setting bolt 107. From FIG. 9 it will be apparent that for one feed cup 92 the seed shaft 92A is provided with three cam wheels 108, 109 and 110 of different grades. The cam wheels 108 and 109, which are located side by side, are provided each with two spaced series of cams 111 and 112. The cam wheels 108, 109 and 110 are arranged each in a space 113, 114 and 115 respectively, which are separated from each other by partitions 116. The spaces 113, 114 and 115 are provided each with slides 117, 118 and 119 respectively, which can be displaced each so that the spaces accommodating the cam wheels 108, 109 and 110 can be shut at will from the seed hopper 61.

The seed hopper 61 of the seeder units of the central portion 56 is provided at the remote ends with vertical plate-shaped supports 120, having stiffening ribs 120A (see FIG. 4). To the plates 62A, which are arranged on the facing sides of the seed hoppers 61, there are secured vertical plate-shaped supports 121. A beam 122 is provided on each pair of supports formed by the support 121 located near the center and the support 120 at the end of the hopper 61. From FIG. 4 it will be seen that the beams 122 extend in opposite directions and are located beneath the lower side of a seed hopper 61 (see FIG. 6). At their remote extremities the beams 122 are bent over rearwardly over a portion 123. The bent-over portion 123 extends in the intended direction of travel. Each bent-over portion 123 is provided at its end with a bearing 124, at right angles to said portion and accommodating a shaft 125. By means of tags 126 the shaft 125 is fastened to a plate 62A of the seeder unit associated with a portion 57 (see FIGS. 5 and 6). From FIG. 5 it will be seen that the shaft 125 is in an oblique position, in which the upper side is located in front of the lower side. The shaft 125 is parallel to a vertical plane in the direction of travel. At the extremity remote from the central portion 56 the seed hoppers 61 of the seeder unit of the portions 57 is provided with plate-shaped supports 127, which extend obliquely to the rear in the traveling direction and are provided on their upper side with a stiffening ridge 128. An axle 129 for a ground wheel 130 is arranged at the ends of the supports 127. The beams 122 are arranged so that they can slightly pivot about their longitudinal axis over a given distance with respect to their supports. In operation, the portions 57 can thus satisfactorily match the surface of the ground. Near the ends of the hoppers 61 of the central portion 56 remote from each other ears 131 are provided on the upper side of the rear side, a hook 132 being pivotally coupled therewith. The free end of the hook 132 is adapted to cooperate with an apertured ear 133, which is secured to the rear side of a hopper 61 of the seeder unit of a portion 57.

The seed shaft 92a of the seeder units of the portions 57 are driven by means of a detachable coupling member 134 from the central portion 56. The coupling 134 comprises a universal joint 135, which is connected with one end with the seed shaft 92a of the seeder unit of a portion 57 (see FIG. 6). The other end 136 is provided with a slot 137, in which a pin 138 is displaceable which pin is coupled with a sleeve 139, which is displaceable along the end 136. The end of the sleeve 139 remote from the universal joint 135 is detachably coupled with the aid of a pin 140 with one end of the seed shaft 92A of the seeder units of the central portion 56.

In the proximity of the bottom side the plate-shaped supports 121 of the central portion 56 are provided with pins 141, which can be coupled with the lowermost arms 142 of the lifting device of a tractor. Between the seed hoppers 61 two tags 143 are provided on the upper side, between which the upper arm 144 of the lifting device of the tractor can be fastened.

The construction described above, which is moved, in operation, in the direction of the arrow A (see FIGS. 4 and 5) provides a seed drill of large working width, which can be hitched to the lifting device of a tractor, while the drive of the feed mechanisms of the various seeder units can be performed in a simple manner by the ground wheel 59, which supports the central portion. In operation the outermost portions 57, hinged to the central portion 56 one on each side of the latter, is capable of pivoting, as stated above, about an axis extending transversely of the traveling direction and formed by the longitudinal center lines of the beams 122, which are pivotal to a restricted extent.

Since the seed tubes are arranged in groups, which are resiliently pivotal both about an axis extending transversely of the intended direction of travel and about an axis extending in the intended direction of travel, a very satisfactory adaptation of the furrow openers to the unevennesses of the soil is obtained. The stress of the spring 85 around the rod 80 may be varied by turning the screw spindle 90, so that the depth of penetration of the furrow openers 74 can be varied. From FIG. 6 it will be apparent that the distance between the feed tubes of two portions is equal to the relative distance between the feed tubes of one portion.

The feed mechanism comprising the cam wheels provides a reliable distribution of seeds, while the quantity of seeds to be distributed can be dosed in a simple manner by means of the spring-loaded bottom flaps 97, which can be fixed in a plurality of positions relative to the cam wheels by means of the lever 98 via the tags 99 on the shaft 96. By means of the setting bolt 107 each flap 97 can be adjusted separately. Since there are provided cam wheels of different degrees of fineness, which may be selected by means of the slides 117, 118 and 119, coarse, medium-sized and fine seeds can be readily sown by the machine described above.

For moving the machine into a transport position the outmost portions 57 together with the wheels 130 can be pivoted about an axis provided by the shafts 125, which are at an angle to the horizontal and the vertical.

Owing to the particular position of the shaft 125, the portions 57 arrive into a position in which the height above the ground in the transport position is comparatively great. In the transport position the portions 57 occupy the position shown in broken lines in FIG. 4. In order to change over the portions to the transport position the hook 132 is disengaged and reengaged in the position shown in broken lines. By means of the pin 140 the coupling 134 between the central portion 56 and the portions 57 can be detached in a simple manner.

Figure 11:
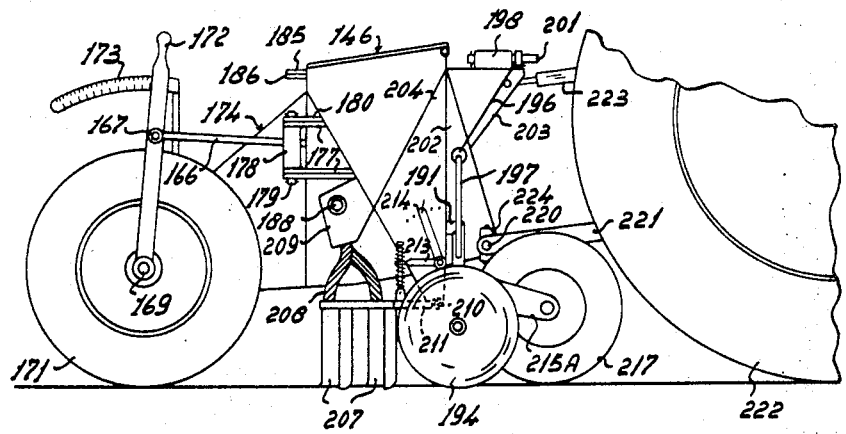
FIG. 11 is a side elevation of the machine shown in FIG. 10.
Figure 12:
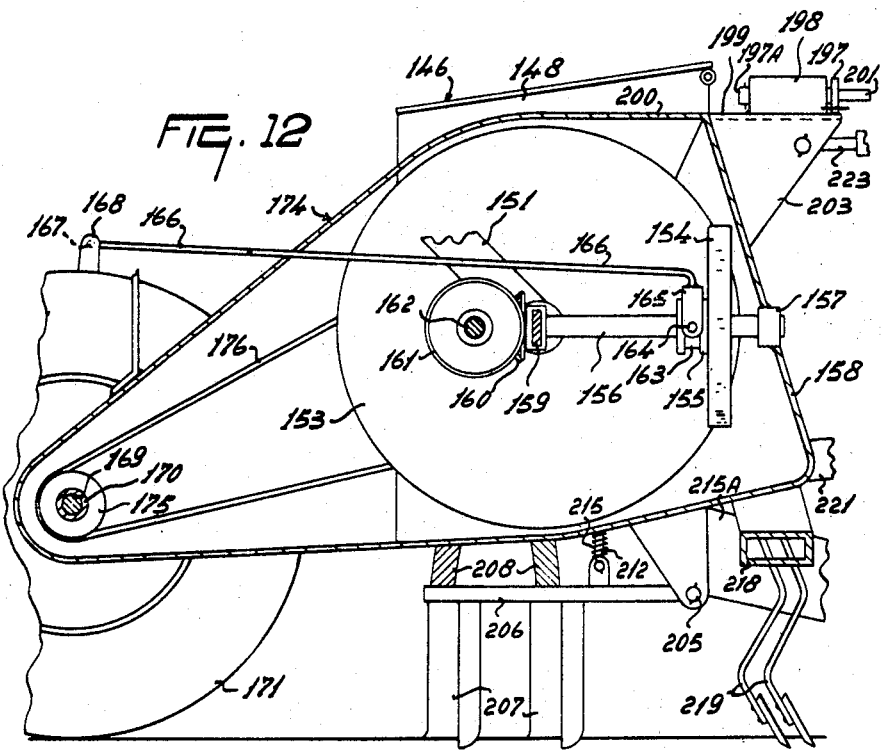
FIG. 12 shows on an enlarged scale an elevation taken on the line XII—XII in FIG. 10.

The device shown in the FIGURES 10–12 is a seed drill, comprising a central portion 145, on each side of which there is arranged a portion 146, said portions being pivotal with respect to the central portion in a manner to be described more fully hereinafter. The central portion 145 comprises two adjacent seeder units, separated by a space 147 and comprising each a seed hopper 148, extending transversely of the intended direction of travel. The space between the two seeder units accommodates, as will be seen from FIG. 10 a transmission gear for driving the feed mechanisms associated with the seeder units. Said transmission comprises a sprocket wheel 149, arranged on a shaft 150, extending transversely of the intended direction of travel and fastened to supports 151, which are provided on the rear walls 152 of the space 147. On either side of the sprocket wheel 149 there is provided a friction disc 153, adapted to cooperate with a friction disc 154. Each friction disc 154 is displaceable by means of a bearing 155 on a guide 156, on which it is, however, not adapted to turn. The guide 156, which serves, in addition, as a rotary shaft, is journalled in a bearing 157 which is secured to the front wall 158 of the space 147 and extends in a direction parallel to the intended direction of travel. Near its end remote from the bearing 157, the guide 156 is supported in a bearing 159, provided on a side wall of the space 147, while said end itself is provided with a bevel gear wheel 160, adapted to cooperate with a bevel gear wheel 161, arranged on the seed shaft 162, associated with the feed mechanism of a seeder unit.

From FIG. 12 it will be apparent that each bearing 157 is provided with a ring 163, which is freely rotatable on said bearing and which is hinged by means of a shaft 164 to a bracket 165, to which a rod 166 is secured, the other end of which is pivoted by means of a shaft 167 to a lever 168. The levers 168 are arranged on a shaft 169, journalled in the hollow axle 170 of two adjacent ground wheels 171, arranged centrally behind the machine. One of the levers 168 is provided with a handle 172, which is displaceable along a curved strip 173 and is fixable in various positions relative to said strip. The hollow axle 170 for the ground wheels 171 is journalled in the upright walls of a housing 174, extending in the direction of travel, which housing joins on one side the rear walls 152 of the said space 147 between the seeder units. Near the center of the housing 174 the ground wheel axle 170 is provided with a sprocket wheel 175, which is linked by means of a chain 176 to the sprocket wheel 149, arranged between the friction discs 153.

It is stated in the foregoing that each of the portions 146 is adapted to pivot to the central portion 145. To this end the central portion is provided on the rear side of a seed hopper 148 at the ends with supports 177, extending transversely of the intended direction of travel and slightly to the rear and located one above the other. A bearing 178 is arranged between said supports for accommodating a shaft 179, which is secured to supports 180, arranged at a given distance from each other one above the other. The supports 180 are fastened near one end of a pivotal portion 146 on the rear side of a seed hopper associated with the seeder unit of said portion. Since this hopper is quite similar to the hoppers associated with the seeder units of the central portion, they are designated by the same reference numerals. On the front side an apertured tag 181 is provided at the remote ends of the hoppers 148 of the central portion. A pin 182 can be taken through the hole and, moreover, through a hole of a tag 183, provided on the front of a hopper 148 of each pivotal portion 146. On the rear sides of the hoppers 148 of the central portion 145 ears 185 are provided, in which a hole is made. Each of the hoppers 148 of the pivotal portions 146 is provided at the end remote from the central portion on the rear side with a tag 186 with a hole 187.

The seed shaft 188 of the feed mechanism of the seeder unit associated with a pivotal portion 146 is connected, in operation, by means of a claw coupling 189 with the seed shaft 162 of the feed mechanism of a seeder unit of the central portion 145.

The central portion 145 is provided at each end with substantially horizontal supports 190, extending transversely of the intended direction of travel and secured to a side wall of a seed hopper 148. The supports 190 accommodate a pivotal part 191, extending in the intended direction of travel and forming part of a pipe 192, extending transversely of the intended direction of travel. At the end remote from the part 191 the pipe 192 is provided with a rod 193, which is slidable in said pipe. The end of the rod 193 remote from the pipe 192 is provided with a rotatable disc 194, serving as a marker. Near the transition of the portion of the pipe 192, extending transversely of the intended direction of travel to the part 191 there is provided an ascending strip 195. The top end of the strip 195 is connected by a strip 195A with the pipe 192. Moreover by means of a wire 196 said top end is connected with an arm 197, one end of which is secured to a shaft 197A, extending in the intended direction of travel. The shaft 197A is journalled in a bearing 198, arranged on a plate 199, which is secured to a plate 200, which covers the upper side of the space 147. At the other end the arm 197 is provided with a handle 201.

On the front of the seed hoppers 148 of the central portion 145, at equal distances from the center of said portion there are arranged plates 202, which extend in the intended direction of travel and downwards (see FIG. 10). The plates 202 are interconnected by a plate, which constitutes the front wall 158 of the space 147. Said front wall 158 of the space 147 is provided near its upper edge with two plates 203, spaced apart from each other and extending in the intended direction of travel and interconnected at their upper ends by a plate 199, on which the bearing 198 for the shaft 197A of the arm 197 is provided.

Near the end the central portion 145 is provided with plates 204, extending downwards parallel to a vertical plane in the intended direction of travel, said plates being interconnected at their lower ends by a beam 205 extending transversely of the intended direction of travel. The beam 205 is hinged to the plates 204 and is provided with a number of supports 206, on which furrow openers 207 are arranged, in which feed tubes 208 open out, which communicate with feed cups 209 on the rear sides of the seed hoppers 148, where cam wheels are arranged on the seed shafts 162 associated with the feed mechanism of the seeder units.

Near the ends of the outmost pivotal portions 146, like with the central portion 145, plates 204 extending downwards parallel to the intended direction of travel are provided, between which a beam 210 is hinged which beam extends transversely of the intended direction of travel. Supports 206, like those of the central portion 145, are provided on the beam 210 for furrow openers 207 cooperating with feed tubes 208. At one end the beam 210 is provided with an arm 211, the end of which, remote from the beam 210, is coupled with an ascending rod 212, which is taken through a hole in an arm 213 of a bell crank 214, arranged on a plate 204, said rod being surrounded by a pressure spring 215 on either side of the arm 213. The beam 205 of the central portion like the beam 210 of the portions 146 is coupled with the bell crank 214 (see FIG. 10 and FIG. 11). Each of the pivotal portions 146 is provided, at its end remote from the central portion, with a plate 215A, secured to a plate 204 and extending in the intended direction of travel and obliquely downwards. At the lower end the plate 215A is provided with a rotary shaft 216, extending transversely of the intended direction of travel, for a ground wheel 217. From FIG. 10 it will be apparent that the shaft 216 is arranged so that in operation the ground wheels 217 are located inside the lateral boundaries of the machine.

On the lower side of the plates 202 there is arranged a support 218, extending transversely of the intended direction of travel and provided with resilient tines 219. The lower sides of the plates 202 are provided with pins 220, which can be coupled with the lowermost arms 221 of the lifting device of a tractor 222. The upper arm 223 of said lift can be arranged between the plates 203, provided on the upper side of the wall 158. One of the pins 220 is movable in a direction of height against the action of a spring housed in a sleeve 224. In this way, in operation, an improved adaptation of the seed drill to the unevenness of the ground is achieved.

In operation the seed drill occupies the position shown in FIG. 11; it is moved in the direction of the arrow A. From FIG. 10 it will be seen that the machine, which is coupled with the lifting device of the tractor 222, is supported at three spaced points by ground wheels. At each end of the machine there is arranged a ground wheel and at least one ground wheel is located near the center. The ground wheel 217 near each end is located in front of the machine, viewed in the intended direction of travel, whereas the ground wheels 171 near the center are located behind the machine, viewed in the intended direction of travel. The diameter of the ground wheels 217 near the ends of the machine is smaller than the diameter of the ground wheels 171. The feed mechanisms of the various seeder units are driven, as stated above, from the ground wheels 171 at the center of the machine. The sprocket wheel 149 in the space 147 is driven through the chain 176 from the sprocket wheel 175 on the axle 170 of the ground wheel. The friction discs 153 on either side of the sprocket 149 drive, through the friction discs 154, and the bevel gear wheels 160 and 161, the seed shafts of the feed mechanisms. With the aid of the lever 168, adapted to pivot about the axle 170 of the ground wheels, the friction discs 154 can be moved towards the rotary shaft of the friction discs 153 or away therefrom by shifting along the guide 156, so that the speed of rotation of the friction discs 154 and hence that of the seed shafts 162 and of the seed shafts 188, associated herewith, is varied. Since the speed of rotation of the seed shafts determines the quantity of seeds supplied by the cam wheels per unit of surface, the displacement of the handled lever 168 along the strip 173 with the scale division, suffices to adjust in a simple and rapid manner the quantity of seeds to be distributed per unit surface. The friction discs 153 and 154 in the space 147, cooperating with each other, the rotary shafts of which are at an angle to each other, constitute a speed control member in the transmission for driving the feed mechanism, which member can be actuated by means of an adjusting mechanism comprising the lever 168.

By means of the arm 197 one or the other of the markers formed by a disc 194 may be brought, during operation, into contact with the soil. The tines 219 of the support 218 provide a last preparation of the soil. By means of the bell crank 214, which can be fixed in different positions, the depth of sowing can be adjusted.

In order to change over the machine to the transport position the two outmost portions 146, pivotally arranged each on one side of the central portion 145, may be hinged aside and be brought into the position shown in broken lines in FIG. 10. The portions hinge about the substantially vertical shaft 179 through an angle of about 180° and extend during transport transversely of the intended direction of travel and substantially parallel to the central portion. From FIGURE 10 it will be seen that the ground wheels 217 are then parallel to the ground wheels 171, so that even without being lifted, the machine can be easily transported. In the transport position the outmost portions 146 may be locked in position by means of the pins 182, passed through the holes 184 and 187 in the ears 185 and tags 186 respectively. For transport purposes the tubes 192 may furthermore be tilted upwards and the rods 193 can be slipped into the tubes 192 up to the discs 194 secured thereto.

We claim:

1. A machine comprising a seed drill having two outermost portions and a central portion, each of said portions including a hopper and a feed mechanism, shaft means for driving said feed mechanism, each of said outermost portions benig pivotable relative to said central portion about a nonhorizontal axis, coupling means on said central portion for attaching said drill to the lifting device of a tractor, each of said outermost portions being provided with at least one supporting ground wheel, said wheel being offset laterally of said portion as seen in plan view whereby the space between said feed mechanism and the ground is relatively unobstructed, and said outermost portions being turnable together with their respective ground wheels about a nonhorizontal axis whereby said drill is converted into transport position.

2. A seed drill as claimed in claim 1, wherein said nonhorizontal axis is located in a vertical plane extending in the intended direction of travel of the machine and said portions are turnable about an angle of approximately 180°.

3. A seed drill as claimed in claim 1, wherein said supporting wheels for said portions are located between the ends of each of said portions.

4. A seed drill as claimed in claim 1, wherein each of said supporting wheels for said portions is located in front of a hopper mounted on said portions.

5. A seed drill as claimed in claim 1, wherein each of said supporting wheels is located behind a hopper mounted on said portions.

6. A seed drill as claimed in claim 1, wherein each portion is turnable about an axis extending transverse of the intended direction of travel.

7. A seed drill as claimed in claim 1, wherein further wheel means is located near the center of said central portion and behind a hopper on said central portion.

8. A seed drill as claimed in claim 7, wherein said further wheel means comprises two wheels positioned adjacent each other with their rotational axes in substantial alignment with each other.

9. A seed drill as claimed in claim 7, wherein the diameter of each of the said supporting wheels for said portions is smaller than the diameter of said further wheel means.

10. A seed drill as claimed in claim 7, wherein said drill includes a feed mechanism which is driven from said further wheel means.

11. A seed drill as claimed in claim 1, wherein each portion includes a feed mechanism and a driving gear, the gear of at least one portion being engageably coupled with the driving gear of the feed mechanism of another portion.

12. A machine comprising a seed drill having a frame, said drill having two outermost portions and a central portion mounted thereon, a hopper mounted on each of said portions, said seeed drill including a feed mechanism associated with said hopper and shaft means for driving said feed mechanism, said outermost portions being pivotable about a substantially vertical axis, each of said outermost portions being supported by a ground wheel, said wheel being offset laterally of said portion as seen in plan view whereby the space between said feed mechanism and the ground is relatively unobstructed, said frame being connectable to a three point lifting device of a tractor, further wheel means for supporting said central portion, said further wheel means being located behind said central portion, said outermost portions being turnably mounted with respect to said central portion about a substantially horizontal axis whereby said outermost portions are independently moveable in a vertical direction to compensate for the unevenness of the ground.

13. A seed drill as claimed in claim 12, wherein said frame includes a longitudinal support for connection to the lowermost two points of the three point lifting device of the tractor.

14. A seed drill as claimed in claim 13, wherein said outermost two portions and said longitudinal support are turnably mounted on said lifting points of said tractor for vertical movement.

15. A seed drill as claimed in claim 12, wherein locking bar means secures said outermost portions in extended position, during operation, said locking bar means being displaceable whereby said outermost portions are moveable to transport position, said locking bar means securing said outermost portions to said central portion.

16. A seed drill as claimed in claim 12, wherein said central portion has supports at each side thereof and said outermost portions are turnably mounted on said supports for vertical movement about substantially horizontal movement.

17. A seed drill as claimed in claim 12, wherein said outermost portions are pivotably connected to said central portion adjacent the rear side of said central portion, said outermost portions being swingable substantially 180° to occupy a trailing position in back of said central portion whereby said ground wheels of said outermost portions are moved from a position forward of said outermost portions to the rear of said outermost portions in transport position.

References Cited

UNITED STATES PATENTS

| | | | |
|---|---|---|---|
| 896,178 | 8/1908 | Tuttle | 111—58 X |
| 1,134,894 | 4/1915 | Newton | 111—34 |
| 1,209,329 | 12/1916 | Peter | 111—54 |
| 1,905,892 | 4/1933 | Botsford | 111—52 |
| 2,345,741 | 4/1944 | Foulke | 172—498 |
| 2,455,148 | 11/1948 | Traver | 172—68 |
| 2,518,306 | 8/1950 | Grier | 111—34 |
| 2,535,222 | 12/1950 | Milton. | |
| 2,901,268 | 8/1959 | Christensen | 172—456 X |
| 3,211,238 | 10/1965 | McClenny | 172—776 X |
| 3,208,536 | 9/1965 | Orendorff | 111—54 |

ABRAHAM G. STONE, *Primary Examiner.*

ANTONIO F. GUIDA, A. E. KOPECKI,
*Assistant Examiners.*